United States Patent [19]

Terry et al.

[11] Patent Number: 4,621,006
[45] Date of Patent: Nov. 4, 1986

[54] HONEYCOMB TABLE MANUFACTURE AND CLEAN-ROOM COMPATIBLE HONEYCOMB TABLES

[75] Inventors: Dennis C. Terry, Costa Mesa; Thomas R. Musser, Fountain Valley, both of Calif.

[73] Assignee: Newport Corporation, Fountain Valley, Calif.

[21] Appl. No.: 663,343

[22] Filed: Oct. 22, 1984

[51] Int. Cl.⁴ .................................................. B32B 3/12
[52] U.S. Cl. ..................................... 428/116; 156/292; 428/131; 428/138
[58] Field of Search ................ 428/116, 117, 118, 131, 428/138; 156/292

[56] References Cited

U.S. PATENT DOCUMENTS

| | | | |
|---|---|---|---|
| 2,870,857 | 1/1959 | Goldstein | 428/116 X |
| 3,137,604 | 6/1964 | Bosch | 156/292 X |
| 3,249,659 | 5/1966 | Voelker | 428/117 X |
| 3,606,460 | 9/1971 | Shannon | 297/445 |
| 3,754,812 | 8/1973 | Mohn | 428/116 X |
| 3,765,993 | 10/1973 | Raffensparger et al. | 428/116 X |
| 3,784,146 | 1/1974 | Matthews | 248/188.8 X |
| 4,035,061 | 7/1977 | Sheridon | 350/360 |
| 4,066,249 | 1/1978 | Huber et al. | 269/21 |
| 4,182,553 | 1/1980 | Sheridon | 350/360 X |
| 4,294,329 | 10/1981 | Rose et al. | 428/118 X |
| 4,300,978 | 11/1981 | Whitemore et al. | 156/292 X |
| 4,370,372 | 1/1983 | Higgins et al. | 428/117 X |
| 4,465,725 | 8/1984 | Riel | 428/138 X |

OTHER PUBLICATIONS

Three Advertisements of the Technical Manufacturing Corporation, is Centennial Drive, Peabody, Mass. 01960.

Primary Examiner—Henry F. Epstein
Attorney, Agent, or Firm—Benoit Law Corporation

[57] ABSTRACT

Honeycomb tables with apertured table leaves are rendered clean-room compatible by sealing the honeycomb cells against the table leaf apertures inside the table leaf. A sealant covering inside surface areas of the table leaf at the honeycomb core may be employed for releasably covering the table leaf apertures. Alternatively, the honeycomb cells may be sealed at a level thereof spaced from the table leaf by a distance several times smaller than a distance between the table leaf and a facing sheet spaced from such table leaf by the honeycomb core.

27 Claims, 7 Drawing Figures

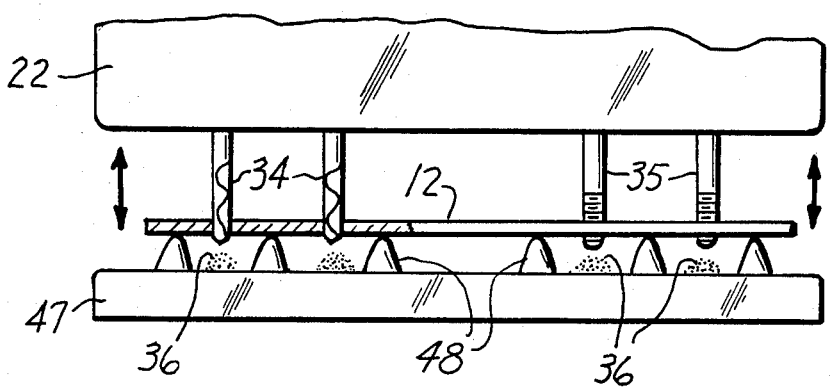
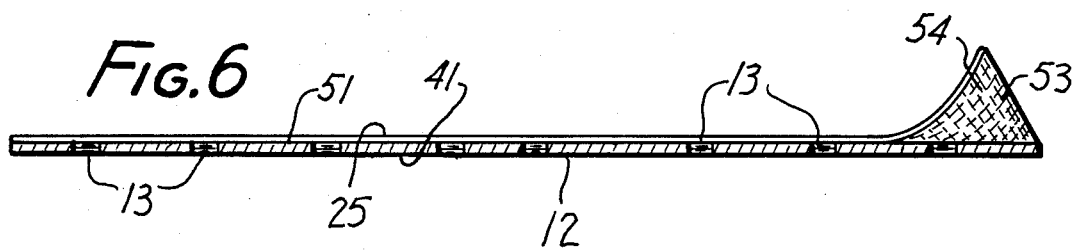
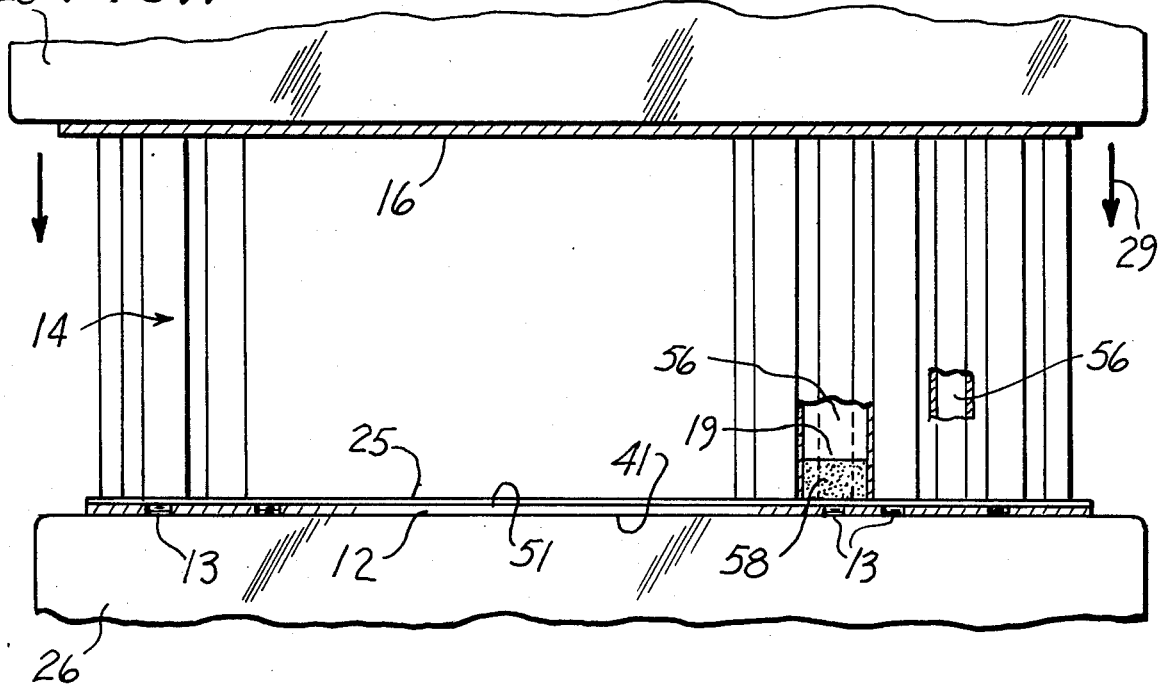

HONEYCOMB TABLE MANUFACTURE AND CLEAN-ROOM COMPATIBLE HONEYCOMB TABLES

BACKGROUND OF THE INVENTION

1. Field of the Invention

The subject invention relates to honeycomb panels and tables, honeycomb panel and table manufacture, and optical tables including honeycomb structures.

2. Information Disclosure Statement

This information disclosure statement is made pursuant to the duty of disclosure imposed by law and formulated in 37 CFR 1.56(a). No representation is hereby made that information thus disclosed in fact constitutes pior art, inasmuch as 37 CFR 1.56(a) relies on a materiality concept which depends on uncertain and inevitably subjective elements of substantial likelihood and reasonableness, and inasmuch as a growing attitude appears to require citation of material which might lead to a discovery of pertinent material though not necessarily being of itself pertinent. Also, the following comments contain conclusions and observations which have only been drawn or become apparent after conception of the subject invention or which contrast the subject invention or its merits against the background of developments subsequent in time or priority.

Utility and advantages of honeycomb structures, panels and tables in various fields of technology are well known, as may, for instance, be seen from U.S. Pat. Nos. 3,606,460, by M. J. Shannon, issued Sept. 20, 1971 and disclosing furniture and table construction with honeycomb panels, 3,754,812, by H. Mohn, issued Aug. 28, 1973 and disclosing optical elements with honeycomb support plate, 3,765,993, by S. L. Raffensparger et al, issued Oct. 16, 1973 and disclosing a layup machine for assembling honeycomb core panels, 4,035,061, issued July 12, 1977 and 4,182,553, issued Jan. 8, 1980, by N. K. Sheridon, disclosing honeycomb display devices, and 4,066,249, by J. G. Huber, issued Jan. 3, 1978 and disclosing a modular vacuum work area with honeycomb core; all being herewith incorporated by reference herein.

Reference may also be had to brochures entitled *Mechanical Properties of Hexcel Honeycomb Materials*, TSB 120, and *The Basics on Bonded Sandwich Construction*, TSB 124, by Hexcel Corporation (1982 Revision).

For an extensive tutorial discussion on optical honeycomb tables, reference may be had to the 1983-1984 Catalog by the subject assignee, Newport Corporation, pp. 3 et seq.

In this respect, by way of example and not by way of limitation, among the most sensitive applications to which optical tables are put are those involving interferometry, where tolerable relative displacements of reflective elements are measured in fractions of a micron and allowable table top bending or twisting is typically much less than a second of arc.

Even when requirements are less demanding, it is best to choose a table system that offers that kind of performance, thereby eliminating any likelyhood of table related problems.

The rigidity of a panel or table used in optical research is one of the primary performance features and, for a given panel thickness and skin, depends largely on the shear modulus of the core.

For these and related reasons, honeycomb cores are greatly preferred for very stable panel and table systems.

In the past, granite plates and slabs were frequently used in laser holography and interferometry work. However, while granite offers great stability, the lack of a generally acceptable means of securing components to granite surfaces, as well as the great weight of granite slabs, is increasingly displacing them from laboratories and similar environments.

A major advantage of honeycomb panels or tables is that their top skin or table leaf can be provided with a large number of mounting holes which have a very minor effect on panel or table rigidity and strength. Typically, such mounting holes are present in great number and are tapped, thereby permitting the mounting of optical instruments and other components in a wide variety of desired locations.

In some applications, the drilling and tapping of holes in the panel or table top skin leaves residues in the cells of the honeycomb core. Where the honeycomb cores have to be very thick between top and bottom skins for high rigidity and stability, contaminants in the honeycomb cells are sometimes difficult to remove.

This, then, can cause problems in clean-room, vacuum and other environments where contaminants are able to leave honeycomb cells through apertures in the top skin to an extent producing a noticeable effect in the particular environment.

In this respect, it has been claimed that the use of threaded inserts in lieu of tapped top skin holes avoids the use of oil that could affect delicate optical opponents. Reference may in this respect be had to the brochure entitled *Optical Hardware*, by Melles Griot (1983), pp. 2 to 6. Among the problems of that approach is, of course, the fact that even a medium sized table of, say, four feet by six feet size, requires over threethousand threaded inserts which have to be individually positioned and attached to the top skin, if mounting holes one inch apart are to be provided in the table top.

Another approach would be to close each tapped mounting hole with a threaded stud, before the honeycomb panel or table is put into service. This, too, would require the use and insertion of thousands of studs in practical applications and, moreover, would, of course, only seal off, but not remove, oil and other drilling and tapping residues from honeycomb cells.

SUMMARY OF THE INVENTION

It is a general object of this invention to overcome disadvantages or meet needs expressed or implicit in the Information Disclosure Statement or in other parts hereof.

It is a related object of this invention to provide improved honeycomb panels and tables, hereinafter simply referred to as "honeycomb tables."

It is a germane object of this invention to provide new or improved methods of manufacturing honeycomb tables.

It is also an object of this invention to render honeycomb tables clean-room compatible.

Other objects of this invention will become apparent in the further course of this disclosure.

From one aspect thereof, the subject invention resides in a method of manufacturing a honeycomb table having a honeycomb core extending between and supporting an apertured table leaf and a facing sheet spaced from that table leaf by a first distance and having internal cells extending between that table leaf and the facing sheet and communicating with apertures in the table leaf. The invention according to this aspect resides, more specifically, in the improvement comprising the step of rendering the honeycomb table clean-room compatible by sealing the cells at a level thereof spaced from the table leaf by a second distance several times smaller than the mentioned first distance.

From a further aspect thereof, the subject invention resides in a method of manufacturing a honeycomb table including a table leaf having an outside surface, and having a honeycomb core supporting that table leaf and extending inside the table leaf between that table leaf and a facing sheet spaced from such table leaf. The invention according to this aspect resides, more specifically, in the improvement comprising, in combination, the steps of providing apertures in the table leaf for receiving fasteners therein for attaching objects at the mentioned outside surface, and rendering the honeycomb table clean-room compatible by sealing the honeycomb core against the above mentioned apertures inside the table leaf.

From a related aspect thereof, the subject invention resides in a honeycomb table comprising, in combination, an apertured table leaf, a facing sheet spaced from that table leaf by a first distance, a honeycomb core extending between and supporting the apertured table leaf and the facing sheet and having internal cells extending between the table leaf and the facing sheet and communicating with apertures in the table leaf, and means for rendering the honeycomb table clean-room compatible, including means for sealing the above mentioned cells at a level thereof spaced from the table leaf by a second distance several times smaller than the mentioned first distance.

From another related aspect thereof, the subject invention resides in a honeycomb table comprising, in combination, an apertured table leaf having an outside surface, a facing sheet spaced from that table leaf, a honeycomb core supporting the table leaf and extending inside the table leaf between the apertured table leaf and the facing sheet and having internal cells between the table leaf and the facing sheet, and means for rendering the honeycomb table clean-room compatible, including means for sealing the mentioned internal cells against the apertures inside the table leaf.

From a related aspect thereof, the subject invention resides in a honeycomb table comprising, in combination, an apertured table leaf, a facing sheet spaced from the table leaf by a first distance, a honeycomb core extending between and supporting the apertured table leaf and the facing sheet and having internal cells extending between the table leaf and the facing sheet, the honeycomb core comprising celled first and second honeycomb sections, with the first section being several times smaller in thickness than the second section and being bonded to the table leaf, and the second section being bonded to said facing sheet, and means for rendering the honeycomb table clean-room compatible, including a sealing sheet bonded to the first section over a side thereof opposite the table leaf, at a level spaced from the table leaf by a second distane several times smaller than the first distance, the second honeycomb section having its cells completely sealed off by the facing sheet and by the sealing sheet so that only shallow cells of the smaller first honeycomb section communicate with apertures in the table leaf.

The subject invention similarly resides in a honeycomb table, comprising, in combination, a table leaf having an outside surface, a pattern of mounting holes in the table leaf, a facing sheet spaced from the table leaf, a honeycomb core supporting the table leaf and extending inside the table leaf between the aperture table leaf and the facing sheet and having internal cells between the table leaf and the facing sheet, and means for rendering the honeycomb table clean-room compatible, including a sealing sheet interposed between the table leaf and the honeycomb core for sealing off the internal cells against the mounting holes in the table leaf.

Other aspects of the invention will become apparent from this disclosure, and no restriction to any aspect or invention is intended by this Summary of the Invention.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or equivalent parts and in which:

FIG. 5 is a side view of a table top skin or leaf and equipment for executing a phase of manufacture of a honeycomb table according to a further embodiment of the subject invention;

FIG. 6 is a longitudinal section through the table top leaf according to FIG. 5, with partially attached means for rendering the table clean-room compatible according to the further embodiment of the subject invention; and FIG. 7 is an elevation of part of a honeycomb table employing the table leaf shown in FIGS. 5 and 6, and illustrates a phase of manufacture of that honeycomb table part.

DESCRIPTION OF PREFERRED EMBODIMENTS

Figure 1:
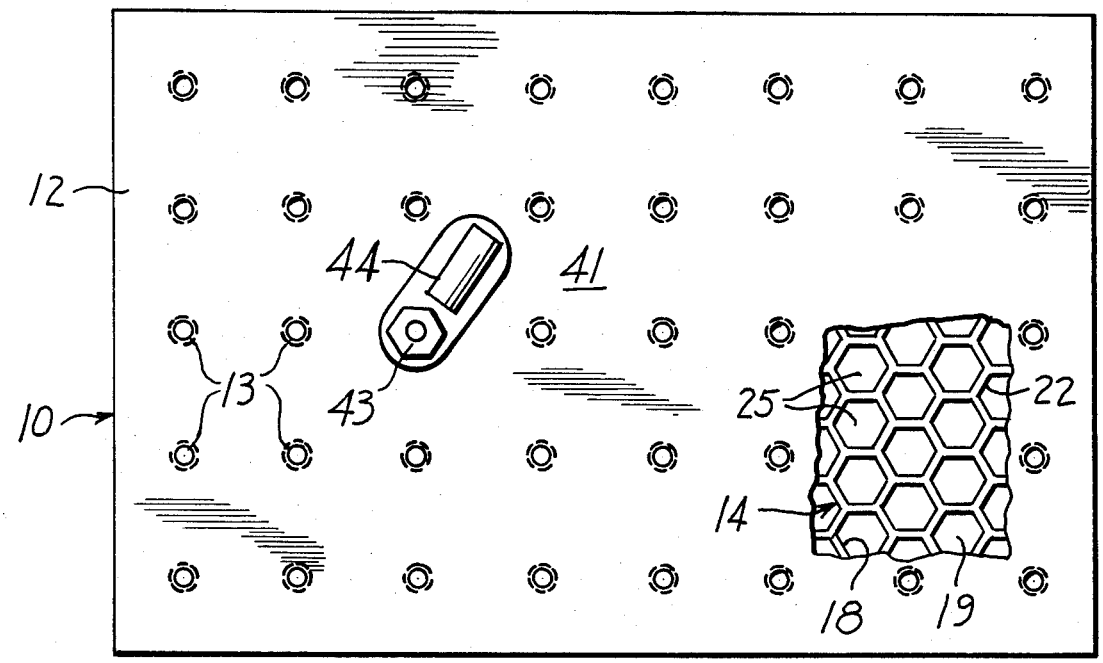
FIG. 1 is a top view of a honeycomb table, having a part broken away to disclose internal structure embodying the subject invention.

The honeycomb table 10 whose top view is shown in FIG. 1 has a top skin or leaf 12, herein for brevity referred to as "table leaf." The subject invention has utility in the manufacture of various honeycomb breadboards, panels, tables and similar structures, herein for brevity referred to as "honeycomb tables."

In practice, honeycomb tables of the type herein disclosed are frequently used with other components and structures, such as in or with vibration isolation systems, as may be seen from the above mentioned Newport Corporation 1983-84 Catalog and from U.S. Pat. No. 3,784,146, by John W. Matthews, Ph.D., issued Jan. 8, 1974 and herewith incorporated by reference herein.

The table leaf 12 is apertured, having a multitude of threaded or tapped mounting holes 13 therethrough, for an attachment of various optical and other conponents used on the honeycomb table for experimentation, research and development, or for industrial analysis, design and testing or a great variety of other purposes. While only a limited number of apertures 13 are shown in FIG. 1, an actual honeycomb table for optical purposes typically has thousands of tapped mounting holes arranged in a regular grid pattern in parallel to the length and the width of the table.

The honeycomb table 10 has a honeycomb core 14 extending between and supporting the apertured table leaf 12 and a bottom or facing sheet 16 spaced from the table leaf 12 by a first distance 17. The honeycomb core 14 has internal cells 18 extending between the table leaf 12 and the facing sheet 16 and communicating with apertures 13 in the table leaf. Of course, this does not necessarily mean that the honeycomb cells 18 extend uninterruptedly from the table leaf 12 to the facing sheet 16. Rather, the honeycomb cells may be interrupted, sealed off or sectioned, as will become more fully apparent in the further course of this disclosure.

In the manufacturing method and construction shown in FIGS. 1 to 4, the preferred embodiment of the subject invention illustrated therein renders the honeycomb table 10 clean-room compatible by sealing the cells 18 at a level 19 thereof spaced from the table leaf 12 by a second distance 20 several times smaller than the first distance 17.

Figure 2:
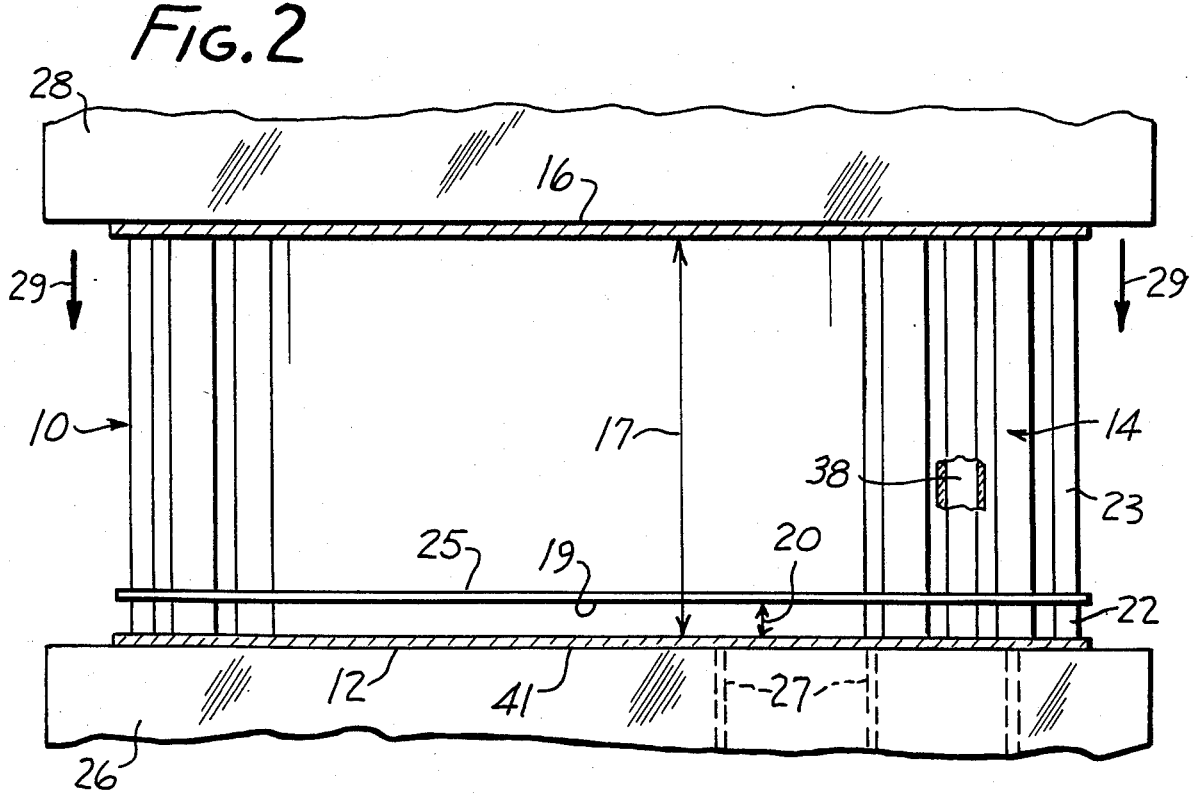
FIG. 2 is an elevation of part of a honeycomb table during a phase of its manufacture according to an embodiment of the subject invention.
Figure 3:
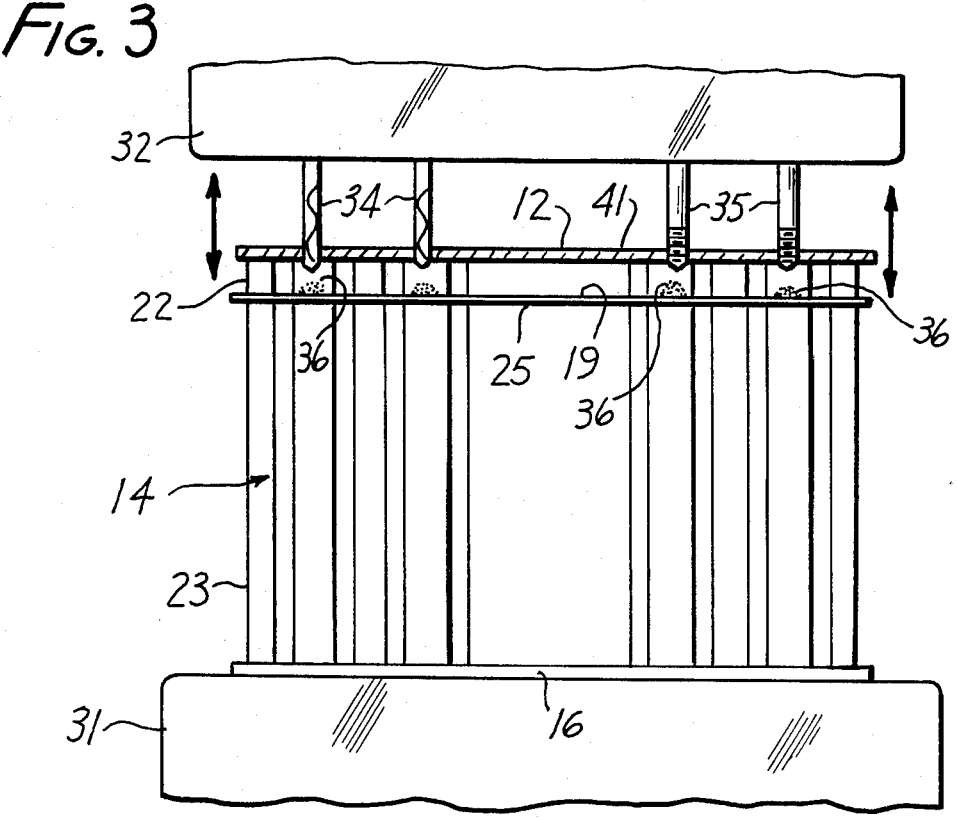
FIG. 3 is a side view of the honeycomb table part of FIG. 2 and illustrates a further phase of the manufacture of the honeycomb table according to an embodiment of the subject invention.
Figure 4:
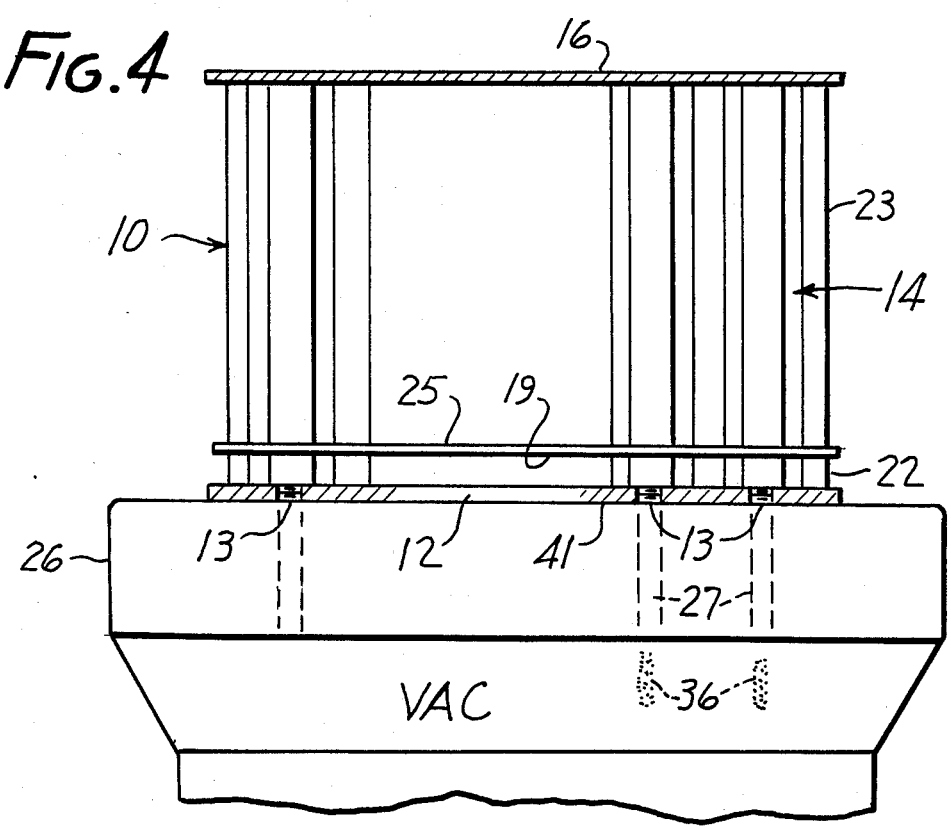
FIG. 4 is a view similar to FIG. 3, illustrating yet another phase in the manufacture of the honeycomb table according to the latter embodiment of the subject invention.

As illustrated in FIGS. 2 to 4, the honeycomb core 14 may be composed of celled first and second honeycomb sections 22 and 23, with the first section being made several times smaller in thickness or depth than the second section, and such first section 22 being located adjacent to, or being made to support, the table leaf 12, while the second section 23 extends to or is made to support the facing sheet 16.

The honeycomb sections 22 and 23 may each be manufactured in a conventional manner. By way of example, the above mentioned brochure TSB 120 describes and illustrates on page 2 thereof the wellknown expansion process of honeycomb manufacture, as well as the equally well-known corrugation process. In this respect, the expression "honeycomb" as herein employed and as generally used in industry is not restricted to exact hexagonal configurations. Rather, that expression is generally also applied to core configuration composed of corrugated sheets that form cells of other than hexagonal cross-section. Of course, those skilled in the art will select the best cell or core configuration for a given application. For instance, if highest precision is essential, cheap substitutes are to be avoided, as the above mentioned Newport Corporation 1983–84 Catalog points out on page 4 thereof under the subtitle "Pseudo Honeycomb Panels." Nevertheless, corrugated sheets glued together at their crests may be suitable in high-performance honeycomb cores.

Various materials used in the manufacture of honeycomb structures may also be employed in the practice of the subject invention. For instance, the honeycomb core 14 or sections 22 and 23 may be made from an aluminum alloy, from steel or of plastic material, to name a few examples.

The smaller honeycomb core section 22 may be first attached to the table leaf 12, while the thicker honeycomb core section 23 is separately attached to the facing sheet 16. Conventional adhesives may be employed for this purpose.

The above mentioned brochures TSB 120 and 124 contain tutorial comments on the use of preferred adhesives and adhesive mats for special purposes.

A sealant or barrier layer 25 is interposed between the core-sections 22 and 23 at the level 19. To this end, the table leaf 12 with attached smaller core sections 22 may be placed on a table 26 while a vacuum is drawn, such as through channels 27 in the support table 26, until the table leaf 12 is extremely flat.

The cells 18 of the smaller first honeycomb section 22 may be sealed off by bonding a sealing sheet 25 to such first section over a side thereof at the level 19 opposite the table leaf 12. The sealing sheet 25 may be made of or include the same material or materials as the honeycomb structure itself. By way of further example, glass or aramidfiber reinforced plastic or adhesive materials may be employed as the sealing sheet 25.

The table leaf 12 is preferably pulled flat on the vacuum table 26 after the smaller first honeycomb section 22 has been attached to that table leaf 12 and the cells 18 of such first section have been sealed, such as by bonding the sealing sheet 25 to the smaller first honeycomb section. This is preferably done before the larger second section is combined with such first section 22.

The larger second honeycomb section 23 may then be bonded to the sealing sheet 25. As shown in FIG. 2, a flat plate 28 resting on the facing sheet 16 and applying a bonding force in the direction of arrows 29, may be employed in conjunction with the vacuum table 26 in bonding the larger second honeycomb section 23 with attached facing sheet 16 to the sealing sheet 25.

That sealing sheet 25 may thus be employed as a means for bonding the unequal honeycomb sections 22 and 23 to each other.

According to the embodiment shown in FIG. 2, the sections 22 and 23 are bonded to form together the honeycomb structure 14 before the apertures 13 are drilled into the table 12.

Once the cells 18 of the smaller honeycomb section 22 have been sealed off, such as by the sealing sheet 25, the apertures 13 may be provided in the embodiment of FIGS. 2 and 3. As shown in FIG. 3, the honeycomb structure 14 with attached table leaf 12 and facing sheet 16 may be inverted relative to its position shown in FIG. 2 and may be placed on a worktable 31. A machine tool 32 may then be employed to first drill and then tap the apertures 13, row by row across and along the table leaf 12.

In practice, a series of drills, followed by a series of tapping bits is employed to this end. For the purpose of illustration, FIG. 3 shows drills 34 on the left-hand side and tapping bits 35 on the righthand side thereof.

As indicated at 36 in FIG. 3, drilling and tapping of the apertures 13 leaves a certain residue in the honeycomb cells. By way of example, that residue may be composed of a cutting oil or other medium used in the making of the tapped apertures, as well as particles of the metal or other material from which the table leaf 12 is made.

Within the scope of the subject invention, the drilling, tapping and cleaning steps shown in FIGS. 3 and 4 may be carried out before the sealed-off smaller section 22 is bonded to the larger table section 23.

The honeycomb table 10 is rendered clean-room proof by cleaning the sealed cells 18 through apertures 13 in the apertured table leaf prior to use of the table in a clean room or even prior to bonding of the honeycomb core section 22 to the core section 23.

If the honeycomb structure 14 had cells extending all the way from the top sheet 12 to the bottom sheet 16, then it would be practically impossible with thick table structures to remove all possible contaminants from such elongated cells. However, the sealedoff shallow cells 18 in the small honeycomb section 22 are readily cleaned without great problems.

By way of example and as shown in FIG. 4, table structure 10 or section 22 is inverted and placed on the vacuum table, and the residues or contaminants 36 are readily removed from the shallow cells through the tapped apertures 13. For instance, the residues 36 may be pulled with the aid of a vacuum through channels 27 of the vacuum table 26.

The table structure may be finished in a conventional manner by encasing it in an appropriate frame. Damping media may be added as desired. The finished table structure may once more be subjected to the cell cleaning process shown in FIG. 4, before it leaves the plant. If desired, the entire cell cleaning operation could be performed only after the table 10 has otherwise been completely finished.

According to FIGS. 2 to 4, the second honeycomb section 23 is combined with the first section 22 so that cells of the second honeycomb section extend between the sealed cells 18 of the first honeycomb section and the facing sheet 16 spaced from the table leaf 12. As mentioned above, the second section 23 may be bonded to the section 22 after the sealed first section 22 has been drilled, tapped and cleaned in the manner illustrated in FIGS. 3 and 4.

The larger cells of the second honeycomb section 23 are completely sealed off by the facing sheet 16 on the one hand and the sealing sheet 25 on the other hand, so that only the shallow cells 18 of the smaller honeycomb section 22 need be cleaned.

The completely sealed-off longer honeycomb cells of the larger section 23 are shown in FIG. 2 at 38 and extend from the sealing sheet 25 to the bottom facing sheet 16.

In terms of structure, the subject invention, from a first aspect thereof, provides a honeycomb table 10 comprising an apertured table leaf 12, a facing sheet 16 spaced from the table leaf by a first distance 17, a honeycomb core 14 extending between and supporting the apertured table leaf 12 and the facing sheet 16 and having internal cells 18, 38 extending between the table leaf and the facing sheet and communicating with apertures 13 in the table leaf. According to the subject invention, that honeycomb table includes means for rendering the honeycomb table clean-room compatible, including the sealing sheet 25 or other means for sealing the cells 18, 38 at a level 19 thereof spaced from the table leaf 12 by a second distance 20 several times smaller than the first distance 17.

From a related aspect thereof, the subject invention also resides in a method of manufacturing a honeycomb table including a table leaf 16 having an outside surface 41, and having a honeycomb core 14 supporting the table leaf and extending inside such table leaf 12 between that table leaf and a facing sheet 16 spaced from that table leaf.

According to this aspect of the invention, apertures 13 are provided in the table leaf, such as in the manner shown in FIG. 3 or FIG. 5, for receiving fasteners, including for instance a bolt 43 therein for attaching objects, including for instance an optical component schematically illustrated at 44, at the outside surface 41 of the optical table. Again, the honeycomb table is rendered clean-room compatible by sealing the honeycomb core 14 against the apertures 13 inside the table leaf 12.

Within the scope of the subject invention, FIGS. 5 to 7 show a further embodiment, according to which the attachment apertures 13 are first provided in the table leaf 12, to which the sealant and the honeycomb core are thereafter applied.

In particular, as shown in FIG. 5, the bare table leaf 12 is first placed on a worktable 47 where it is held by supports 48 in spaced relationship thereto, permitting execution of the drilling and tapping operation by the machine tool 32 described above.

The embodiment of the invention illustrated in FIG. 6 then executes the step of applying to an inside surface 51 of the table leaf, opposite the above mentioned outside surface 41, a sealant releasably covering the apertures 13. As indicated in FIG. 6, that sealant may in fact be the same as the above mentioned sealing sheet 25 shown in FIGS. 2 to 4 and, therefore, bears the same reference numeral. As illustrated in FIG. 6 at 53 in a partially removed portion of the sealing sheet 25, that sheet may include reinforcing fibers or a reinforcement fabric.

As seen in FIGS. 2 to 4 and 7, the sealing sheet 25 is interposed between the table leaf 12 and the honeycomb core 14 or 23 for sealing off the internal cells 38 or 56 against the mounting holes 13 in the table leaf. As seen in FIG. 7 by reference to FIG. 6, the sealing sheet 25 releasably covers the mounting holes 13 and extends between the honeycomb core 14 and the table leaf along an inside surfae 51 of the table leaf 12.

For instance, a fiberglass fabric reinforced adhesive or plastic material 54 may be used as the sealing sheet 25. An aramid-fiber reinforced adhesive or plastic material may also be used at 25.

The adhesive or sealant 54 in the sheet 25 may comprise an epoxy, silicone rubber, or urethane sealing or adhesive compound.

The honeycomb core 14 is attached to the inside surface 51 of the table leaf 12. If the sealant is also an adhesive, then the honeycomb core 14 may be attached to the table leaf with that sealant or adhesive coating.

As seen in FIG. 7, the honeycomb structure 14 with attached facing sheet 16 is applied to the adhesive sealing sheet 25 for attachment of the honeycomb structure 14 to the table leaf 12. The vacuum table 26 and top plate 28 may be employed for this purpose. The adhesive in the sealing sheet 25 may then be cured, such as with the aid of a conventional hardener and by heat or passage of time, depending on the nature of the adhesive. Epoxy and similar adhesives that do not require elevated external curing temperatures are generally preferred for present purposes.

The completed honeycomb tables described so far with the aid of FIGS. 2 and 7 comprise an apertured table leaf 12 having an outside surface 41, a facing sheet 16 spaced from such table leaf, and a honeycomb core 14 supporting the table leaf and extending inside such table leaf between that apertured table leaf 12 and the facing sheet 16 and having internal cells 18, 38 or 56 between the table leaf and facing sheet.

According to the subject invention, means for rendering the honeycomb clean-room compatible include the sealing sheet 25 or other means for sealing the internal cells against the apertures 13 inside the table leaf 12.

As disclosed in or in connection with FIGS. 6 and 7, the means for sealing the internal cells 56 include a sealant 25 covering inside surface areas of the table leaf 12 at the honeycomb core 14 opposite the table leaf outside surface 41, and covering also the apertures 13 at the inside of the table leaf.

Such sealant or sealing sheet 25 does not interfere with the normal operation of the honeycomb table. For instance, if fastening bolts 43 are threaded into the apertures 13, then the sealing sheet 25 is only touched when the length of the bolt below its head exceeds the thickness of the table leaf 12. However, even if the bolt exceeds such thickness, the optical or other component 44 still can readily be attached to the table leaf 12, since the bolt will then push into or through the sealing sheet 25. This will not have an adverse effect at that point, since no contaminant is introduced into the honeycomb cells thereby.

While FIG. 7 mainly shows the embodiment of the subject invention so far described, it also illustrates a further embodiment, according to which a clean-room compatible sealing compound is provided. Such compound may, for instance, be a silicone rubber, polyurethane foam or other stable compound that is easily removed mechanically but does not exude objectionable contaminants.

As shown in FIG. 7, honeycomb cells 56 are filled from the apertured table leaf 12 to the above mentioned level 19 with such sealing compound 58. In practice, such partial filling of honeycomb cells with sealing compound 58 may proceed through apertures 13. In fact, such apertures may at the same time be filled with the sealing compound as well. In that case, the sealing compound 58 may be removed from apertures 13 in the table leaf as needed for an attachment of components 44 to such table via the latter apertures. In practice, such partial removal of the sealing compound 58 may be effected with the aid of a tool similar to the tapping bits 35. However, since no cutting oil or other potential contaminant is used in partially removing the sealing compound 58, there is no danger of contaminating the environment of the honeycomb table.

Various modifications and variations within the spirit and scope of the subject invention are apparent to those skilled in the art from the subject extensive disclosure.

We claim:

1. In a method of manufacturing a honeycomb table having a honeycomb core extending between and supporting an apertured table leaf and a facing sheet spaced from said table leaf by a first distance and having internal cells extending between said table leaf and said facing sheet and communicating with apertures in said table leaf, the improvement comprising the step of:
rendering said honeycomb table clean-room compatible by sealing said cells at a level thereof spaced from said table leaf by a second distance several times smaller than said first distance.

2. A method as claimed in claim 1, including the step of:
rendering said honeycomb table clean-room proof by cleaning cells through apertures in said apertured table leaf prior to use of the table in a clean room.

3. A method as claimed in claim 1, including the steps of:
providing a clean-room compatible sealing compound; and
filling said cells from said apertured table leaf to said level with said sealing compound.

4. A method as claimed in claim 3, including the step of:
filling with said sealing compound also apertures in said apertured table leaf communicating with said cells.

5. A method as claimed in claim 4, including the step of:
removing said sealing compound from apertures in said table leaf as needed for an attachment of components to said table via the latter apertures.

6. A method as claimed in claim 1, including the steps of:
composing said honeycomb core of celled first and second honeycomb sections, with said first section being made several times smaller in thickness than said second section and being made to support said table leaf, and said second section being made to support said facing sheet;
sealing cells of said first honeycomb section; and
combining said second section with said first section so that cells of said second honeycomb section extend between said sealed cells and said facing sheet spaced from said table leaf.

7. A method as claimed in claim 6, including the steps of:
sealing cells of said first honeycomb section by bonding a sealing sheet to said first section over a side thereof opposite said table leaf; and
bonding said second honeycomb section to said sealing sheet.

8. A method as claimed in claim 6, including the steps of:
bonding said first honeycomb section to said table leaf; and
pulling said table leaf flat on a vacuum table after said first honeycomb section has been attached to said table leaf and said cells of the first section have been sealed, but before said second section is combined with said first section.

9. In a method of manufacturing a honeycomb table including a table leaf having an outside surface, and having a honeycomb core supporting said table leaf and extending inside said table leaf between said table leaf and a facing sheet spaced from said table leaf, the improvement comprising in combination the steps of:
providing apertures in said table leaf for receiving fasteners therein for attaching objects at said outside surface; and
rendering said honeycomb table clean-room compatible by sealing said honeycomb core against said apertures inside the table leaf.

10. A method as claimed in claim 9, including the steps of:
applying to an inside surface of said table leaf, opposite said outside surface, a sealant releasably covering said apertures; and
attaching said honeycomb core to said inside surface of the table leaf.

11. A method as claimed in claim 9, including the steps of:
applying to an inside surface of said table leaf, opposite said outside surface, a sealant releasably covering said apertures; and
attaching said honeycomb core with said sealant to said table leaf.

12. A method as claimed in claim 9, including the steps of:

covering an inside surface of said table leaf, opposite said outside surface, with an adhesive coating including a sealant releasably covering said apertures; and attaching said honeycomb core to said table leaf with said adhesive coating.

13. A honeycomb table, comprising in combination:

an apertured table leaf;

a facing sheet spaced from said table leaf by a first distance;

a honeycomb core extending between and supporting said apertured table leaf and said facing sheet and having internal cells extending between said table leaf and said facing sheet and communicating with apertures in said table leaf; and means for rendering said honeycomb table clean-room compatible, including means for sealing said cells at a level thereof spaced from said table leaf by a second distance several times smaller than said first distance.

14. A table as claimed in claim 13, wherein:

said sealing means include a clean-room compatible sealing compound filling said cells from said apertured table leaf only to said level.

15. A table as claimed in claim 13, wherein:

said sealing means include a clean-room compatible sealing compound filling said cells only from said level to apertures in said apertured table leaf communicating with said cells.

16. A table as claimed in claim 15, wherein:

said sealing compound also fills the latter apertures.

17. A table as claimed in claim 13, wherein:

said honeycomb core comprises celled first and second honeycomb sections, with said first section being several times smaller in thickness than said second section and being bonded to said table leaf, and said second section being bonded to said facing sheet;

said sealing means including means for sealing cells of said first honeycomb section; and said second honeycomb section has cells extending between said sealed cells and said facing sheet spaced from said table leaf.

18. A table as claimed in claim 17, wherein:

said means for sealing cells of said first honeycomb section include a sealing sheet bonded to said first section over a side thereof opposite said table leaf.

19. A table as claimed in claim 18, wherein:

said second honeycomb section is bonded to said sealing sheet over a side opposite said facing sheet.

20. A honeycomb table, comprising in combination:

an apertured table leaf having an outside surface;

a facing sheet spaced from said table leaf;

a honeycomb core supporting said table leaf and extending inside said table leaf between said apertured table leaf and said facing sheet and having internal cells between said table leaf and said facing sheet; and means for rendering said honeycomb table clean-room compatible, including means for sealing said internal cells against said apertures inside said table leaf.

21. A honeycomb table as claimed in claim 20, wherein:

said means for sealing said internal cells include a sealant covering inside surface areas of said table leaf at said honeycomb core opposite said outside surface, and covering said apertures.

22. A honeycomb table as claimed in claim 20, wherein:

said means for sealing said internal cells include a sealant including an adhesive covering inside surface areas of said table leaf at said honeycomb core opposite said outside surface and attaching said table leaf to said honeycomb core, said sealant releasably covering said apertures.

23. A honeycomb table as claimed in claim 20, wherein:

said means for sealing said internal cells include an adhesive coating attaching said table leaf to said honeycomb core and releasably covering said apertures.

24. A honeycomb table, comprising in combination:

an apertured table leaf;

a facing sheet spaced from said table leaf by a first distance;

a honeycomb core extending between and supporting said apertured table leaf and said facing sheet and having internal cells extending between said table leaf and said facing sheet, said honeycomb core comprising celled first and second honeycomb sections, with said first section being several times smaller in thickness than said second section and being bonded to said table leaf, and said second section being bonded to said facing sheet;

means for rendering said honeycomb table cleanroom compatible, including a sealing sheet bonded to said first section over a side thereof opposite said table leaf, at a level spaced from said table leaf by a second distance several times smaller than said first distance, said second honeycomb section having its cells completely sealed off by said facing sheet and by said sealing sheet so that only shallow cells of said smaller first honeycomb section communicate with apertures in said table leaf.

25. A honeycomb table, comprising in combination:

a table leaf having an outside surface;

a pattern of mounting holes in said table leaf;

a facing sheet spaced from said table leaf;

a honeycomb core supporting said table leaf and extending inside said table leaf between said apertured table leaf and said facing sheet and having internal cells between said table leaf and said facing sheet; and means for rendering said honeycomb table cleanroom compatible, including a sealing sheet interposed between said table leaf and said honeycomb core for sealing off said internal cells against said mounting holes in said table leaf.

26. A honeycomb table as claimed in claim 25, wherein:

said sealing sheet releasably covers said mounting holes and extends between said honeycomb core and said table leaf along an inside surface of said table leaf.

27. A honeycomb table as claimed in claim 25, wherein:

said sealing sheet includes reinforcing fibers in a sealant.

* * * * *